United States Patent [19]

Grainger et al.

[11] Patent Number: 5,686,549
[45] Date of Patent: Nov. 11, 1997

[54] POLYMERS USEFUL IN FORMING SELF-ASSEMBLED BONDED ANISOTROPIC ULTRATHIN LAYERS AND THEIR USE

[75] Inventors: David W. Grainger; Fang Sun, both of Beaverton, Oreg.

[73] Assignee: Research Corporation Technologies, Inc., Tucson, Ariz.

[21] Appl. No.: 456,135

[22] Filed: May 31, 1995

Related U.S. Application Data

[63] Continuation of Ser. No. 37,065, Mar. 25, 1993, abandoned.
[51] Int. Cl.$^6$ ............................................. C08G 77/04
[52] U.S. Cl. .................... 528/25; 525/474; 425/436 R; 427/407.1; 428/391; 428/400
[58] Field of Search ............................... 528/25; 525/474; 425/436 R; 427/407.1; 428/391, 400

[56] References Cited

U.S. PATENT DOCUMENTS

| | | |
|---|---|---|
| 3,576,779 | 4/1971 | Holdstock et al. |
| 4,539,061 | 9/1985 | Sagiv. |
| 4,902,769 | 2/1990 | Cassidy et al. |
| 4,929,666 | 5/1990 | Schmidt et al. |
| 4,968,828 | 11/1990 | Yamamoto. |
| 5,006,624 | 4/1991 | Schmidt et al. |
| 5,028,679 | 7/1991 | Terae et al. |
| 5,067,797 | 11/1991 | Yokokura et al. |
| 5,077,085 | 12/1991 | Schnur et al. |
| 5,078,791 | 1/1992 | Singh et al. |
| 5,106,561 | 4/1992 | Singh et al. |
| 5,173,365 | 12/1992 | Singh et al. |
| 5,204,126 | 4/1993 | Singh et al. |
| 5,252,534 | 10/1993 | DePalma et al. |
| 5,294,402 | 3/1994 | Schrepp et al. |

FOREIGN PATENT DOCUMENTS

| | | |
|---|---|---|
| 0355497A2 | 2/1989 | European Pat. Off. |
| 0 368 320 | 5/1990 | European Pat. Off. |
| 0393551A3 | 10/1990 | European Pat. Off. |
| 0404333A3 | 12/1990 | European Pat. Off. |
| 0506425A3 | 9/1992 | European Pat. Off. |
| 2 517 099 | 11/1982 | France. |
| 4002513C1 | 7/1991 | Germany. |
| PCT/US94/ 03153 | 3/1994 | WIPO. |

OTHER PUBLICATIONS

A. Laschewsky et al., "Self-Organization of Polymeric Lipids with Hydrophilic Spacers in Side Groups and Main Chain: Investigation in Monolayers and Multilayers", *J. Am. Chem. Soc.*, 109, pp. 788–796, (1987).

L. HauBling et al., "Surface Functionalization and Surface Recongnition: Plasmon Optical Detection of Molecular Recognition at Self Assembled Monolayers", *Makromol Chem., Macromol. Symp.*, 46, p. 145, (1991).

J. Schneider et al., "Structural Studies of Polymers With Hydrophilic Spacer Groups: Infrared Spectroscopy of Langmuir–Blodgett Multilayers of Preformed Polymers with Hydrocarbon Side Chains", *Macromolecules*, 22, pp. 205–210, (1989).

M. Suzuki et al., "Characterization of Monolayer and Bilayer (polymer Monolayer) Structures for Their Use As a Lubricant", *Thin Solid Films*, 160, pp. 453–462, (1988).

J. Seto et al., "Frictional Properties of Magnetic Media Coated With Langmuir–Blodgett Films", *Thin Solid Films*, 134, pp. 101–108, (1985).

J. Hopken et al., "Polymer Surface Modification by Fluorocarbon–Hydrocarbon Substituents", pp. 937–938.

David A. Stenger et al., "Coplanar Molecular Assemblies of Amino-and Perfluorinated Alkylsilanes: Characterization and Geometric Definition of Mammalian Cell Adhesion and Growth", *J. Am. Chem. Soc.*, 114, pp. 8435–8442, (1992).

Gunter von Kiederowski, "Light–Directed Parallel Synthesis of Up to 250000 Different Oligopeptides and Oligonucleotides", *Angew. Chem. Int. Ed. Engl.*, 30, pp. 822–823, (1991).

Uday Kumar et al., "Induction of Ferroelectricity in Polymeric Systems through Hydrogen Bonding", *Agnew. Chem. Int. Ed. Engl.*, 31, No. 11 pp. 1531–1533.

Deborah H. Charych et al., "Self–Assembled and Langmuir–Blodgett Organic Thin Films as Functional Materials", *MRS Bulletin*, pp. 61–66, (1992).

Didier Lefevre et al., "Chemical Reactivity in Organized Medium: Building up a Two–Dimensional Polymer", *Langmuir*, 9, pp. 150–161, (1993).

Michael J. Owen, "Siloxane Surface Activity", *Silicon–Based Polymer Science: A comprehensive Resource* pp. 704–739 (1990).

R. Dorigo et al., "New Polysiloxanes Obtained by Chemical Modification Using Hydrosilylation: Synthesis and Properties", pp. 420–421.

V. Novotny et al., "Tribology of Langmuir–Blodgett Layers", *Langmuir*, 5, pp. 485–489, (1989).

Vito DePalma et al., "Friction and Wear of Self–Assembled Trichlorosilane Monolayer Films on Silicon", *Langmuir*, 5, pp. 868–872, (1989).

Yunahi Li et al., "Characterization of Thiol Self–Assembled Films by Laser Desorption Fourier Transform Mass Spectrometry", *J. Am. Chem. Soc.*, 114, pp. 2428–2432, (1992).

J.W. Miller, "Synthetic Lubricants and their Industrial Applications", *JSL 1*: pp. 136–152 (1984).

(List continued on next page.)

*Primary Examiner*—Helen Lee
*Attorney, Agent, or Firm*—Scully, Scott, Murphy & Presser

[57] ABSTRACT

Polymers which form ultrathin, chemically adherent, anisotropic films on substrate surfaces impart useful properties to the surface. The polymers can be functionalized with any of a wide array of side chains and groups to impart properties and/or uses to the substrate.

12 Claims, No Drawings

OTHER PUBLICATIONS

Shumuel Zalipsky, "Preparation and Use Of an Aminoethyl Polyethylene Glycol–Crosslinked Polystyrene Graft Resin Support for Solid–Phase Peptide Synthesis", pp. 257–260 (1985).

Barry Arkles et al., "Fluoropolymer Solid Lubricants", *Advances In Polymer Friction and Wear*, Polymer Science and Technology, vol. 5B, pp. 453–467 (1994).

Takeo Shimidzu, "Functionalization of Conducting Polymers Towards Organic Superlattice and Molecular Device", 1991, *AIP Conference Proceedings 262: Molecular Electronics–Science and Technology*, 129–137.

J. Cheung et al., "Process Towards the Fabrication of Langmuir–Blodgett Thin Film of Conducting Polymers", 1990, *Mol. Cryst. Liq. Cryst.*, vol. 190: 133–143. *Proceeding of the Symposium on Clectro–responsive Molecular and Polymeric Systems Part 2.*

Patent Abstracts of Japan, vol. 15, No. 104.

Patent Abstracts of Japan, vol. 9 No. 68.

# POLYMERS USEFUL IN FORMING SELF-ASSEMBLED BONDED ANISOTROPIC ULTRATHIN LAYERS AND THEIR USE

This is a continuation of application Ser. No. 08/037,065, filed on Mar. 25, 1994, now abandoned.

BACKGROUND OF THE INVENTION

The present invention relates to the formation of ultrathin polymeric films bonded onto a substrate. The invention relates more particularly to polymers capable of forming such ultrathin films as bonded coatings, and more particularly to such polymers having functionalized side groups affording the capability of imparting any of a number of desirable properties to the object to whose surface the polymeric film has been applied.

Previously attempted techniques for applying polymeric layers to surfaces have suffered from a variety of drawbacks. Simply applying a previously formed polymer in bulk or from solution to a surface does not permit control of polymer morphology at the surface, and does not permit precise control of film thickness or lateral morphology at film thicknesses less than on the order of a half micron.

It has also been proposed to prepare self-assembled films on a surface by contacting the surface with monomeric species which react with each other at the surface to form a polymeric coating. This approach does not insure the optimal formation of a uniform, anisotropic film at the surface. In addition, this approach is likely to be limited in the ability to provide functional groups on the generated polymer. Indeed, the presence of functional groups on monomers that might be employed in this approach might retard or even prevent the formation of the desired polymer at the surface, and prevent further chemical modifications.

It is also known to prepare films, frequently referred to as Langmuir-Blodgett films, starting from polymers from which are pendant amphiphilic side chains. Such prepolymerized amphiphiles are formed into an ultrathin layer on the surface of water, and transferred to a solid support by dipping the support carefully through the film into the water and then withdrawing the support from the water. The resultant films are very limited in the geometry they afford, and are only very weakly cohesive and weakly held to the surface. These factors make this technique impractical for preparing a useful, adherent, stable, mechanically rigorous ultrathin coating on a commercial article. In addition, this technique is difficult and costly to carry out in practice even to obtain the weakly held films that result.

Thus, there remains an unmet need for a product and a process by which an adherent, ultrathin, anisotropic film can be applied readily and bound (bonded) to any of a variety of substrates. There is also an unmet need for such a product and process by which such a film can be applied to the surface of an article, wherein the polymer comprising the film has pendant functional groups which enhance or add to the useful properties of the article.

BRIEF SUMMARY OF THE INVENTION

One aspect of the present invention comprises a polymer having a plurality of pendant anchoring chains which contain an anchoring group for binding through chemisorption to a solid surface, wherein the polymer is capable upon said binding of forming from solution a self-assembled ultrathin anisotropic film on said surface.

In a particularly preferred aspect of the present invention, the polymer also contains a plurality of side chains without anchoring groups, which are optionally substituted with a functional group.

Yet another aspect of the present invention resides in the process of forming a chemically adherent, ultrathin, anisotropic film on a surface, comprising contacting the surface with a solution containing the aforesaid polymers under conditions effective to cause said anchoring groups to chemisorb to said surface.

Another aspect of the present invention comprises an article having on a surface thereof an adherent ultrathin, anisotropic film comprising a polymer having a plurality of pendant anchoring chains terminally bound to said surface. Preferably, the film also comprises other functional side chains exposed at the ambient surface, such as through intra-chain phase separation wherein the side chains, polymer backbone, and anchoring chains are chemically incompatible with one another and are repelled from each other.

DETAILED DESCRIPTION OF THE INVENTION

The polymers of the present invention are useful in having the ability to form stable, adherent, ultrathin films by direct bonding and assembly on a variety of surfaces, preferably by self-assembly in a manner which provides an anisotropic structure such that functional groups or functionalized side chains on the polymer are disposed on the film surface remote from the substrate to which the polymer film is attached. The polymers thus afford the ability to append functional chains and/or groups to the surface of essentially any article, and to tailor the chains and/or groups to the specific property or function that is desired.

Thus, through this invention one can in effect bind to a substrate a film with essentially any functional group that is desired.

The polymers to which the present invention may be adapted include any polymer having the characteristic structure composed of repeating monomeric units (which may be the same or different, as copolymers), and wherein some or all of the units making up the polymer main chain may be substituted with side groups and/or side chains and/or side chains which themselves are substituted with functional groups.

Preferred polymers include those having a siloxanyl main chain, that is, polymers containing in the main chain repeating units of the general formula —Si—O— wherein the silicon atoms may be substituted with any of a variety of substituents as described herein. Other preferred polymers include those having in the main chain a repeating unit of the general formula —C—C—, wherein one or both of the carbon atoms in such repeating units may be unsubstituted or substituted as disclosed further herein. Particularly preferred polymers are substituted vinylic polymers of the general formula —C—C(R)— wherein R is —OH, —COOH, —CN, —OC(O)CH$_3$, phenyl or substituted phenyl (substituted with e.g. —OH or C$_1$-C$_{10}$ alkyl). Among the most preferred are methacrylates and acrylates, by which is meant repeating units wherein one of the carbon atoms of the —C—C— unit is substituted with —C(O)O— wherein the oxygen atom may be further substituted as described herein.

Other polymers include polyamides, i.e. wherein the units making up the main chain are connected together by a —C(O)NH— linkage. Other polymers include polyimides, polyethylene amines, polyquinolines, polyanthrazolines, poly(phenylene vinylene), polyphosphazenes, polyethers, and poly(—N=C—). The polymer can also be a light-emitting polymer, or an electrically conductive polymer such as poly(aniline) poly(pyrrole), or poly(thiophene).

While the present invention is not intended to be limited as to any particular chain length or molecular weight of the polymers, it is noted that polymers useful in the present invention particularly include those having a molecular weight ranging from on the order of 10,000 to on the order of 150,000. Too low a molecular weight is undesirable because of inherently low degrees of functional group and anchoring group substitution. Too high a molecular weight is undesirable because of solubility difficulty, steric hindrance (to, e.g., reactivity in attaching side chains and/or anchoring chains), and unwanted crystallinity.

The polymers of the present invention are further characterized in that they contain a plurality of pendant anchoring chains which contain terminal anchoring groups for binding the anchoring chain through chemisorption to a surface. Preferred surfaces are metallic; graphitic, by which is meant graphite and other fully reduced or nearly reduced carbonaceous substances; or polar, preferred examples of which are oxidic, that is, they contain surface oxygen or hydroxyl groups. Polymeric substrates which include these species at the surface are also suitable, as are films and coatings which contain these species at the surface and which are themselves bound to the surface of an article. Effective anchoring groups include substituents which bond to the surface by electron transfer, electrostatic attraction or direct covalent bonding. Thus, regardless of the specific embodiment, the polymers of the present invention form chemically adherent films on their substrates.

Examples of anchoring groups include isonitrile; pyridine, which is particularly effective as an anchoring group to a graphite surface; —COOH, which is particularly effective as an anchoring group to metal oxides such as $Al_2O_3$; mono-, di-, or tri(loweralkoxy)silyl of the formula —Si$(OCH_3)_p$ (lower alkoxy)$_{3-p}$ where p is 1, 2 or 3 and wherein the alkoxy groups each contain 1 to 6 carbon atoms, more preferably 1 to 4 carbon atoms, the most preferred examples of which have the formula —Si$(OCH_3)_3$ or Si$(CH_3)_2OCH_3$; mono, di and/or trihalosilyl, of the formula —Si$(halo)_p$ $(CH_3)_{3-p}$ where p is 1, 2 or 3, preferably —Si$(CH_3)_2$Cl or trichlorosilyl; —SH; alkylsulfides, by which is meant —S-(alkyl), the alkyl preferably containing 1 to 30 carbon atoms; thioethers containing 1 to 30 carbon atoms; and linear and cyclic alkyl disulfides, particularly including cyclo($C_3$–$C_6$ alkylene disulfide) and straight and branched $C_1$–$C_{30}$ alkyl disulfides, referred examples of which include

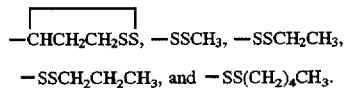

—$SSCH_2CH_2CH_3$, and —$SS(CH_2)_4CH_3$.

The anchoring chains which are pendant from the polymer backbone and which are terminated by the anchoring groups described herein preferably comprise linear alkylene chains which may contain one or more oxygen (—O—), or ester-type (—C(O)O— or —OC(O)—) linkages. That is, the anchoring chain attached to the polymer backbone can be alkyl, alkoxyalkyl, acyloxyalkyl, alkoxycarboxyalkyl, or poly(alkoxy) containing 1 to e.g. 10, 20 or more alkylene or alkyleneoxy groups, preferably ethyleneoxy groups. The anchoring side chain can optionally be fluorinated. Liquid crystalline, mesogenic groups and photochromic aromatic groups can also be used as side chain anchors, permitting alignment and organization by ring stacking.

The length of the anchoring chain should be sufficient to permit self-assembly at a surface to form the desired anisotropic film. Thus, the anchoring alkylene chains will preferably contain at least about 10 carbon atoms. The optimum length will vary depending upon the system chemistry; a satisfactory length is any which permits achievement of the desired anisotropic ultrathin film. Typical satisfactory attaching alkylene chain lengths are up to about 30 carbon atoms. Smaller lengths are possible when no side chain lateral organization is desired. It is frequently advantageous to incorporate oxygen or ester linkages into the anchoring side chain, in the region near its attachment point to the polymer main chain, to assist in obtaining the desired self-assembly of the chains upon attachment thereof to a surface. Examples of preferred anchoring chains incorporating such linkages are set forth below in the examples.

The density of the anchoring chains on any given polymer molecule may vary; about 10 to about 80 percent, and more preferably about 10 to about 40 percent, of the repeating units in the polymer backbone can be substituted with an anchoring chain as described herein.

While polymers as described thus far, wherein the repeating units have no additional special substitution, are useful in the formation of e.g. hydrophobic films and protective films, it is a significant advantage of the present invention that the polymers can additionally be substituted with functional substituents, by which is meant (a) side chains imparting a particular property to the polymer or to the article to which the polymer is anchored, and (b) side chains substituted with one or more functional groups, which functional group(s) impart a property or function to the polymer or to the article to which the polymer is anchored.

It has been found that self-assembly as described herein by which the anchoring chains become bound to the surface of an article results in performance as though the bonding sites for functional substituents on the atoms making up the main chain (e.g. the carbon or silicon in the preferred embodiments) are oriented on the side of the polymer that is opposite from the side from which the anchoring chains are pendant. This behavior, referred to herein as anisotropy or as being anisotropic, means that when functional substituents are pendant from those bonding sites, they behave as though they are separated by the polymer from the surface to which the anchoring groups are bound. This behavior is accentuated when the anchoring chains and functional substituents are chemically incompatible with each other. The choice of such functional chains is essentially limitless and depends on the desired use of the functionalized polymer. Such uses will be described more fully hereinbelow. As will be apparent, the choice of functional substituents which may be present in the polymers of the present invention is guided by the desired use for or property of the article to which the thus-functionalized polymer is bound. It will often be possible to impart a desired property to a surface, by employing as the functional substituents entities which per se exhibit that property, such as hydrophilicity (obtained using hydrophilic moieties), hydrophobicity (using hydrophobic moieties), tack (using moieties that provide adhesiveness), and so forth.

Representative functional chains include long alkyl chains which may comprise between 10 and 100 carbon atoms to impart hydrophobicity and inhibit binding of other materials to the surface; fluorinated alkyl chains and preferably perfluroalkyl, perfluorooxy-alkyl, perfluoralkyleneoxy, perfluoroalkyloxy-alkyl, or perfluoroalkyl-alkyl chains, to impart lubricity, that is, to create a low-friction surface; or polyalkyleneoxy and preferably polyethyleneoxy chains, to impart hydrophilicity. In addition, the functional chains can comprise a linking chain such as an alkylene bridge containing e.g. 1 to 18 or even up to 50 carbon atoms, to which a functional group is or can be attached. Functional groups include moieties such as —$NH_2$, —OH, —C(O)OH, —C(O)Cl, $CH_2$=CHC(O)O—, $CH_2$=C(CH)C(O)O—, —OC(O)$CH_3$, cationic, anionic or zwitterionic species, $SF_5$, $SO_2F$, a protein (e.g. enzyme, or an antibody), amino acid, or polypeptide; a polar adhesive group; a pharmacologically active agent; a catalyst, a dyestuff, a nematic (liquid crystal) molecule; a chromophore; or a polymerizable moiety such as a moiety containing an ethylenically unsaturated polymerizable group, examples of the latter including olefinic groups such as ethylene (as —CH=$CH_2$) or an acrylate or methacrylate moiety substituted to the side chain via the ester oxygen. In addition, the functional substituent may contain two or more functional groups or moieties such as —$NH_2$, —OH, —C(O)OH, —C(O)Cl, or ethylenically unsaturated sites, to which functional groups can be attached. Depending on the desired properties of the thus functionalized polymer, from 1 to 90 percent and more preferably 20 to 80 percent of the repeating units in the polymer are substituted with functional groups or functional side chains.

Examples of cationic functional groups include ammonium groups, in which the nitrogen is substituted with hydrogen, $C_{1-30}$ alkyl, and/or $C_{2-30}$ alkenyl. Examples of anionic functional groups include inorganic anions such as phosphate, phosphonate, sulfate, sulfonate and silicate. Examples of zwitterionic functional groups include betaines and sultaines.

The polymers of the present invention are usually formed prior to their being contacted with the surface to which they are to be applied. This feature provides increased structural regularity and anisotropy of the applied films compared to films formed at the surface by reaction of monomeric species. The polymers can be formed and recovered for storage and for subsequent use, or they can be prepared and isolated in a solution which is then applied (preferably substantially freed of unconsumed reactants and other byproducts) to the surface to be treated.

The polymers of the present invention can be further substituted with small groups that while not necessarily contributing functional usefulness to the article to which the polymer is bound, serve the useful function of spacing apart the attaching chains and the functional chains, if present. Examples of such substituents include, for —(C—C)— based polymer backbones, hydrogen, hydroxy, alkyl containing 1 to 6 carbon atoms, and for acrylate based polymer backbones include alkoxyalkyl groups containing 2 to 6 carbon atoms, preferably hydroxy or methoxyethyl groups. Examples of such groups for siloxanyl based polymers include hydrogen, and alkyl containing 1 to 4 carbon atoms, and preferably methyl.

Examples of anchoring chains pendant from vinyl polymer backbones or from the ester oxygen of acrylate repeating units, or from the silicon atoms of siloxanyl repeating units include $C_{10}$-, $C_{16}$-, and $C_{22}$-alkoxyethyl; hexyl; octyl; $C_{20}$-alkyl; $C_4$-, $C_{10}$- and $C_{22}$-acyloxyethyl; $C_4$-, $C_{10}$, and $C_{22}$-acyloxyhexyl; $C_4$-, $C_{10}$- and $C_{22}$-alkoxycarbonylethyl; poly(ethoxy) carbonylethyl; decyloxycarbonyldodecyl; pentanoyloxyethyl; undecanoyloxyethyl; hexadecanoyloxypropyl; undecanoyloxyoctyl; hexadecyloxypropyl; decanoyloxypoly(ethoxy); lower alkanoyloxyoctyl; lower alkoxycarboxydecyl which are preferably linear and in which the poly(ethoxy) chains contain 4 to 20 ethoxy units.

Synthesis

Polymers in accordance with this invention can be prepared in which the anchoring chains, or the functional substituents, are randomly distributed along the main chain of the polymer. Alternatively, the polymer chain can comprise blocks along the main chain from which only anchoring chains are pendant, the blocks, being separated from each other by blocks from which only functional substituents are pendant. In another alternative, individual anchoring chains and functional chains alternate with each other. In yet another alternative, anchoring chains are first bound to the surface and are thereafter reacted with specific sites on a solution phase polymer whereupon the polymer becomes anisotropically bound to the anchoring chains. The polymer can already have pendant functional chains, or can subsequently have functional chains bound to it.

Turning first to synthesis of polymers having randomly distributed anchoring and/or functional chains, wherein the polymer has a siloxanyl backbone, synthesis can proceed from a polymer with repeating units —(HSi(R)—O)— wherein R is a substituent such as methyl. When the anchoring chain is to comprise an alkyl chain to which the anchoring group is terminally attached, the polymer is reacted (for instance in the presence of a platinum catalyst) with the analog of the anchoring chain which is terminally ethylenically unsaturated (e.g. with $CH_2$=CH$(CH_2)_{10}$— (AG) when the intended anchoring chain has 12 carbon atoms and AG is the anchoring group.

To prepare a polymer having a siloxanyl backbone wherein the anchoring chain includes a —C(O)O— linkage, when it is desired that the final product also have a functional side chain as described herein, the polymer is also reacted with $CH_2$=CH—$R_f$ for instance over a platinum catalyst, wherein $R_f$ is the moiety which, together with the alkylene carbons, comprises the functional side chain.

When it is desired to include an ester linkage in the anchoring chain, the polymer is reacted first with $CH_2$=CH—$R_c$ wherein $R_c$, together with the ethylenic carbons will comprise the moiety linking the polymer to the ester linkage, and $R_c$ is terminally protected with e.g. a nitrophenylsulfonyl group. The protecting group is then removed by hydrolysis and the resulting —$R_c$OH group is reacted to complete the anchoring chain synthesis. If the anchoring group is to be silyl, the —$R_c$OH terminus is reacted with a terminally unsaturated acyl chloride to form the ester, and the terminal olefin group is then reacted with e.g. $HSiCl_3$, $HSi(OCH_3)_3$, or another mono-, di-, or tri (lower alkoxy) silyl or mono-, di-, or trihalosilyl analog. If the anchoring group is to comprise disulfide, the $R_c$OH terminus is reacted with the COOH-terminated analog of the remaining portion of the anchoring chain.

Alternatively, polymers in which the anchoring chains comprise an ester linkage can be prepared by first reacting the starting polymer with e.g. allyl-O-nitrophenyl sulfonate, hydrolyzing the resulting intermediate to deprotect it, reacting the intermediate with e.g. $R_fC(O)Cl$ or $R_fSO_2F$ directly (wherein $R_f$ comprises the functional chain), or then reacting the product with the COOH-terminated remainder of the desired disulfide-bearing anchoring group, or with terminally unsaturated acyl chloride and then with e.g. $HSiCl_3$, $HSi(OCH_3)_3$, or other analogous mono-, di-, or tri(alkoxy) or (halo) silane. Ester linkages can also be incorporated by reacting the starting polymer with a 1,2-epoxy alkene derivative, and then reacting with ethylene-terminated acyl chloride followed by trifunctional silane, as above, or with lithium aluminum hydride followed by the COOH-terminated remainder of the disulfide-bearing anchoring chain.

Siloxanyl polymers with anchoring chains, functional chains, or both, that contain an ether oxygen can be prepared by reacting the starting polymer with the corresponding ether that is terminated with ethylene, such as for example $CH_2=CH(CH_2)_iO(CH_2)_j(CF_2)_kF$, $CH_2=CH(CH_2)_iO(CH_2)_j$—$SS(CH_2)_kH$, or $CH_2=CH(CH_2)_iO(CH_2)_jSiX_3$ where i, j and k are integers of choice and X is halo or lower alkoxy. The above ethylene-terminated ethers can be prepared, for instance, by reacting an alkanol, e.g. $CF_3(CH_2)_jOH$ with $CH_2=CH(CH_2)_iCl$ in the presence of a phase transfer catalyst such as tetrabutyl hydrogen ammonium sulfate; or by the light-induced reaction of the ω-halo-1-alkene with acetyl mercaptan to form $CH_3C(O)S(CH_2)_j$-(halo) followed by hydrolysis and reaction with $H(CH_2)_kSH$ and $I_2$, and thereafter reacting the product with e.g. $CH_2=CH(CH_2)_iONa$.

When the polymer is based on —(C—C)— repeating units, the anchoring side chains and any functional side chains are preferably formed via formation of ether, ester or amide linkages, for instance by reacting a side chain precursor terminated with —COOH with a polymer containing hydroxyl-substituted repeating units such as 2-hydroxyethyl acrylate units, or vinyl alcohol units, or by reacting a side chain precursor terminated with hydroxyl with a polymer containing COOH-substituted repeating units such as acrylic acid or methacrylic acid.

Synthesis is described in more detail in the following Example.

EXAMPLE 1

Polymer Synthesis

1. Hydrosilylation: To a 30 ml thick-walled ampule were charged 6 ml anhydrous toluene (HPLC grade, distilled over $CaH_2$ before use), 0.2624 g (4.364 mmol) of polyhydrogen methylsiloxane (1) (Hüls, 4,500–5,000 mol. wt.), 0.4350 g (3.447 mmol) of 1,2-epoxy-7-octene (distilled over $CaH_2$), and 0.7 mg of catalyst ($H_2PtCl_6$). After the mixture was degassed with pure $N_2$ for 3 min, 1.329 g (2.979 mmol) of 1H,1H,2H-perfluoro-1-decene (Riedel-deHaën, 95%, used as received) was added. The ampule was capped with a glass stopper connected to latex tubing, and immersed into an oil bath at 90±5° for 24 h. Removal of solvent by rotary evaporation followed by drying in vacuum at 60° C. afforded an oily liquid (2), brown in color, with quantitative conversion of the hydrosilylation product. IR (NaCl coating), $cm^{-1}$: 3044 (C—H stretching of epoxy-ring), 2928 (C—H stretching of methylene), 1208 (C—F stretching of difluoromethylene, 1094 (Si—O stretching of siloxane backbone). $^1$H-NMR ($CDCl_3$), ppm: 0.12 (m, $C_3$Si-epoxy), 0.20 (br, $CH_3$Si-fluoro), 0.55 (br, $CH_2$Si-epoxy), 0.66 (br, $CH_2$Si-fluoro), 1.38–1.55 (m br, $CH_2$), 2.47,2.76 (m t, $CH_2OC$ in epoxy ring), 2.92 (s, CHOC in epoxy ring), $^{13}$C-NMR ($CDCl_3$), ppm: 47.23, 52.49 ($CH_2OCH$ in epoxy ring), 114.77 ($CF_2$), 138.26 ($CF_3$). The molar composition of the hydrosilylated polysiloxane, expressed by perfluoro chain/epoxy chain ratios is 0.21/0.79 as determined by FTIR spectroscopy, and 0.20/0.80 as determined by $^1$H-NMR spectrometry.

Other hydrosilylated polysiloxanes with systematic changes in perfluoro/epoxy ratios from 0.35/0.65 to 0.42/0.58 were also synthesized by analogous procedures to those described above except that different feed ratios were applied to achieve different substitution stoichiometries. A wide spectrum of polymer compositions can be achieved by these methods.

2. Glass transition temperature ($T_g$) of hydrosilylated polysiloxanes: Bulk hydrosilylated polymer $T_g$s (a physical parameter reflecting the flexibility of polymer molecular chains) were measured by differential scanning calorimetry on a Mettler DSC-30 thermal analysis system at a heating rate of 20° C./min under a nitrogen flow of 80 $cm^3$/min. The T values are dependent on polymer composition and are listed in Table 1.

TABLE 1

| Polymer[1] | Glass transition temperature of hydrosilylated polysiloxanes | | | | | |
|---|---|---|---|---|---|---|
| | PHMS | PEPO | PFEPO (21/79) | PFEPO (23/77) | PFEPO (36/64) | PFEPO (42/58) | PF |
| $T_g$ (°C.) | –136.0 | –92.5 | –81.0 | –80.4 | –77.2 | –68.5 | –37.1 |

[1]PHMS—poly(methylhydro)siloxane (1)
PEPO—poly(7,8-epoxyoctyl)methyl siloxane (x/y = (moles of 7,8-epoxyoctyl-substituted Si)/(moles of heptadecafluoro-decyl-substituted Si) = 0/1)
PFEPO—poly(7,8-epoxycotyl)methyl siloxane-copoly(heptadecafluoro-decyl)methyl siloxane (x/y = 21/79, 23/77, 37/64, 42/58).
PF—poly(heptadecafluorodecyl)methyl siloxane (x/y = 1/0)

3. Reduction of alkyl side chain epoxy-ring: A solution of hydrosilylated polysiloxane (2) (0.3034 g, 0.97 mmol epoxy group) and lithium aluminum hydride (0.2115 g, 5.57 mmol) in 8 ml toluene was stirred at 55°–60° C. for 20 h. To this solution, a mixture of THF-$H_2O$ (12 ml:0.5 ml) was added dropwise, and the solution was stirred for an additional 30 min. A semi-solid with light yellow color (3) was collected in quantitative reduction efficiency after filtration and concentration of the filtrate. Yield: 95%. IR (NaCl coating), $cm^{-1}$: 3350 (H—O stretching of hydroxyl group), 2964 (C—H stretching of $CH_3C(OH)$), 2856 (C—H stretching of methylene), 1206 (C—F stretching of difluoromethylene), 1090 (Si—O stretching of siloxane). $^1$H-NMR ($CDCl_3$), ppm: 0.1 (m, $CH_3$—Si), 0.7 (br, $CH_2$—Si), 1.17 (d, $CH_3C(OH)$), 3.78 (br, CH(OH)).

Other hydrosilylated polysiloxanes with different ratios of perfluoro chain/epoxy chains were also reduced by $LiAlH_4$ in quantitative yields.

4. Esterification of side chain hydroxyl groups (anchor group addition): To 8 ml sample vials 89 mg (0.28 mmol of hydroxyl group, x/y=4:1) of epoxy-reduced polysiloxane (3) and 85 mg (0.76 mmol) of 4-N,N-dimethyl)aminopyridine were dissolved in THF (4.0 ml). A pre-mixed solution of 100 mg (0.31 mmol) of 11-(n-pentyldithio)undecylic acid and 111 mg (0.54 mmol) of 1,3-dicyclohexylcarbodiimide (DCC) in THF (4.0 ml) was added to the above polymer solution. After the mixture was stirred at room temperature for 72 h, the solution was filtered, and solvent was removed by rotary evaporation. The residual crude product was further purified by repetitive dissolution-reprecipitation in EtOAc—$CH_3OH$ to furnish 82 mg of waxy solid with light yellow color (4). IR (NaCl coating), $cm^{-1}$: 2926 (C—H stretching of methylene), 1732 (C—O stretching of ester carbonyl group), 1212 (C—F stretching of difluoromethylene), 1084 (Si—O stretching of siloxane).

Analogous esterification reactions using epoxy-reduced polysiloxanes (3.) with different hydroxylperfluoro ratios were also performed in a similar manner as described above, yielding 48–78% of products (4).

5. Preparation of self-assembled monolayers (SAMs) of disulfide-bearing fluorinated siloxane polymers (4) (x/y=21/79): Gold substrates used for monolayer assembly were prepared in a diffusion-pumped thermal evaporator ($10^{-7}$ Torr). A pre-deposited Ti/W layer (1000 Å) and Pd layer (200 Å) were used as adhesive interlayers over $SiO_2$ on semiconductor grade silicon wafers. Vapor deposition of 99.999% gold from a resistively heated tungsten holder onto the Pd-coated wafer (4-inch polished silicon wafer) surface generated a 1500–2000 Å-thick gold layer. The gold deposited silicon wafer was cut into 1×3 cm slides by scoring the wafer on the reverse side and cut slides were immersed into the polymer (4) solution ($CHCl_3$, 1 mM) for 72 h. The slides were then removed from solution and thoroughly rinsed by chloroform (6 ml), ethanol (5 ml), and Millipore water (6 ml), and dried in a pure $N_2$ stream. Ellipsometric thickness for this polymer monolayer was 34.7±2.3 Å. The polymer layer refractive index assumed for the thickness calculation is 1.41, an average value of the perfluoro chains, siloxane backbone, and alkyl chains.

Polymer SAMs from other disulfide-bearing fluorinated siloxane polymers (4) (x/y=44/56, 49/51, 66/34) can also be prepared by the similar procedure as described above.

6. Characterization of polymer SAM by contact angle, reflection FTIR and XPS: Static contact angles for water and hexadecaneon self-assembled monolayers derived from polymer (4) (x/y=20/80) were determined on a Ramé-Hart Model 100 contact angle goniometer, and the values are $\theta_{H2O}$–91°, and $\theta HD$=7°, respectively. The surface reflection FTIR spectrum of SAM was taken at an average grazing angle of 74°–82° in single external reflection mode. The SAM spectrum shows the same spectral characteristics as spin-coated films prepared from the same polymer (4) (x/y=21/79), except that much lower absorbance values are observed due to decreased film thickness. The surface elemental analysis data of this SAM are summarized in Table 2 as determined by X-ray photoelectron spectroscopy.

TABLE 2

SAM films of polymer (4) (x/y = 21/79):
Atomic composition of monolayer determined by XPS

| | Elements | | | | | Element Ratios | | | |
|---|---|---|---|---|---|---|---|---|---|
| | C | O | S | Si | F | O/C | Si/C | F/C | F/S |
| Experimental | 59.3 | 27.2 | 1.0 | 5.5 | 7.0 | 0.46 | 0.09 | 0.12 | 7.0 |
| Theoretical* | 76.5 | 8.9 | 5.6 | 3.4 | 5.6 | 0.12 | 0.04 | 0.07 | 1.0 |

*Calculated theoretically based on polymer composition.

The increased percentages of oxygen, silicon and fluorine and decreased values of carbon and sulfur atoms observed between experimental and theoretical compositions are strong evidence that perfluorocarbon chains are exposed at the outer ambient surface, carbon chains are relatively buried within the sublayer of the film, and sulfur atoms are most likely located at monolayer-substrate interface as anchor groups.

7. Coupling of terminal double-bond functionalized side chains to epoxy-reduced polysiloxane (3): An alternative approach to modify the epoxy-reduced polysiloxane (3) to prepare SAM polymers for different substrate binding is via coupling of olefin-terminated monomer alkanes through esterification. Excess amounts of ω-undecenoyl chloride were used as acylation reagents and triethylamine was used as an acid scavenger (catalyst). After reaction for 48 h, excess acid chloride was destroyed by addition of methanol. Purification of the crude mixture by filtration and concentration followed by washing with $CH_3OH$ (3 times, 10 ml each) provided the quantitatively esterified viscous product (5) in 72% yield. IR (NaCl coating) $cm^{-1}$: 3077 (C—H stretching of terminal olefin), 2927 (C—H stretching of methylene), 1734 (C—O stretching of ester carbonyl group), 1180 (C—F stretching of difluoromethylene), 1095 (Si—O stretching of siloxane).

EXAMPLE 2

(i) Synthesis of [11-(n-pentyl) dithio]undecyl allyl ether hydrocarbon side chain (4) was synthesized by a three step procedure including (i) the addition of thiol acetic acid to the double bond of 11-bromo-1-undecene followed by an acidic hydrolysis of the adduct to produce 11-bromo-1-undecane thiol (2), (ii) oxidation of (2) in the presence of n-pentane thiol by iodine to generate (n-pentyl) dithio undecyl bromide (3), and (iii) Williamson ether condensation of (3) with sodium allyl alcoholate to afford the final product (4) total yield: 36.8 %, $R_f$=0.74 ($CHCl_3$/EtOAc, 7:3, v/v). $^1$H-NMR ($CDCl_3$), ppm: 0.92 (t, 3H, $CH_3$), 1.25–1.42 (br, m, 18H, —$CH_2$—), 1.7 (m, 6H, $CH_2CS$, $CH_2COC$), 2.7 (t, 4H, $CH_2S$), 3.42, 3.55 (t, t, 4H, $CH_2O$), 5.22 (q, 2H, =$CH_2$), 5.92 (m, 1H, —CH=).

(ii) Preparation of perfluoroalkyl, dithioalkyl grafted polysiloxanes copolymers Polyhydrogenmethylsiloxane (1.89 mmol), pentadecafluoro-octyl allyl ether (1.20 mmol), and [11-(n-pentyl)dithio] undecyl allyl ether (0.86 mmol) were all dissolved in 8 ml toluene. To this mixed solution was added platinum divinyltetramethyl disiloxane (catalyst, 4×10$_{-3}$ mmol). After reaction was carried out at 60° C., under $N_2$ atmosphere, for 20 h, solvent was removed by rotaevaporation. Crude product was purified by repetitive dissolution (chloroform) and reprecipitation (acetone-ethanol, 1:1, V/V). Final, pure copolymer (1) product contains 41 mol % perfluoroalkyl and 21 mol % dithioalkyl side chains as measured by $^1$H-NMR.

(iii) Self-assembling monolayer from siloxane copolymer (1)

Ultrathin polymeric self-assembling monolayer films were prepared by immersing freshly deposited gold substrates (on silicon wafers) into polymer-chloroform solutions (2 mM) for 48 hr. Substrates were then rinsed first with chloroform, then ethanol, and finally Millipore water. This self-assembling monolayer has a thickness of 33±3 Å, and a water static contact angle of 95±1°. Surface spectroscopy (XPS) reveals 36 atomic % ("at. %") fluorine (vs. theoretical value of 33 wt. %) at 0° sampling angle (from normal), 39 at. % fluorine at 55° take-off angle, and 46 at. % fluorine at 80° angle proving a significant enrichment of fluorine at the outer surface of this self-assembling monolayer in bound assemblies.

EXAMPLE 3

(i) Preparation of perfluoroalkyl, trichlorosilyl alkyl grafted polysiloxane copolymers. Polyhydrogen methyl siloxane (PHMS), 1H, 1H, 2H-heptadeca-fluorodecene, and octyl-1-enyl trichlorosilane were mixed in 1:0.5:0.6 (by mole) in toluene (10%). After hydrogen hexachloroplatinum (IV) hydrate (catalyst) (1.0%) was added, the solution mixture was stirred at 90°–100° C. for 48 hrs. Solvent was then removed by rotaevaporation and crude product was purified by washing with hexane and drying in vacuum. 40% of the fluoroalkane was found in product as measured by $^1$H-NMR.

Similar polymers with different fluoroalkane content ranging from 15%–55% were also prepared by changing the feed perfluoroalkene/chlorosilyl alkene ratios.

(ii) Polymer self-assembling monolayers from siloxane polymers containing trichlorosilyl anchoring groups.

SAM films were prepared by immersing freshly cleaned silicon wafers into polymer chloroform solutions (1 mM) for 24 hrs. After rinsing the coated wafer sequentially with CHCl$_3$, ethanol, and water, the wafer was characterized by ellipsometry (which showed the thickness of the monolayer to be 50 Å) and water contact angle (which was found to be 102°).

EXAMPLE 4

To illustrate synthesis in which the anchoring chains are bound to the surface prior to attachment of those chains to the main polymer, 11-bromo-undecene was converted to 11-monochlorosilyl undecene or 11-thioundecene using published procedures. These compounds were assembled onto silicon wafers or gold-deposited silicon wafers, respectively from 1 mM solutions in chloroform for 24 hrs. Wafers were rinsed with chloroform and ethanol and dried under nitrogen. Wafers were then immersed into 2 mM chloroform solutions of polyhydrogenmethyl siloxane or perfluoralkyl-co-methylhydro-siloxane prepared as described in Example 2 for 24 hrs in the presence of the same platinum catalyst. Wafers were then rinsed in chloroform and ethanol. Reflection infrared spectra on assembled films indicated absence of residual Si—H groups, indicating reaction completion. Aqueous contact angles indicated presence of fluorine alkyl chains (θ=102°). Ellipsometry showed monolayer dimensions (a film thickness of 27 Å). Methylhydro groups on the siloxane backbone reacted in the presence of Pt catalyst with terminal olefin groups on the self-assembled monolayer. This created a two-dimensional anchored network of polymer and introduced perfluoralkyl side chains to the layer's outer surface via covalent attachment of the siloxone backbone.

To illustrate synthesis of polymers wherein the anchoring chains and functional chains are in distinct blocks, a telechelic hetero-bifunctional polyethyleneoxide (Nippon Oil and Fats) containing one protected terminal hydroxyl group and one terminal olefin group per chain is reacted with a commercial poly(methylhydro) siloxane via a Pt-catalyzed reaction in toluene at 60° C. via the conventional hydrosilation reaction using the olefin. The AB block copolymer is purified by precipitation into diethylether, dried, and then re-dissolved in toluene. The methylhydro siloxane block is then derivatized with either anchoring chains or functional side chains according to methods described in Example 1. The hydroxy protecting group remaining on the polyethylene is then removed by hydrolysis. This end of the copolymer is reacted with the carboxyl. terminus of polylysine or polybenzylglutamate. The reaction utilizes dicyclohexyl carbodiimide at low temperature (0° C). The ABC block copolymer is purified by aqueous extraction followed by precipitation in diethyl ether. Derivatization of the C block with either anchoring chains or functional side chains is then pursued, depending on the chemistry was previously chosen for the siloxane segment. When anchoring chains are attached to siloxane block A, then functional side chains are attached to the C block, and conversely. When the C block is polybenzylglutamate, the benzyl component is first hydrolyzed in base and the glutamate backbone is then esterified with the respective chain type using dicyclohexylcarbodiimide and amino- or hydroxyl-terminated side chains. This procedure yields an ABC block copolymer with different chains on A and C blocks separated by a flexible B polyether block.

Synthesis of polymers wherein the anchoring chains and functional chains are strictly alternating, can proceed via polymerization of maleic anhydride with vinyl isocyanate in solution at elevated temperature, followed by purification via precipitation into an immiscible liquid, washing, and drying. Then, one stoichiometric equivalent of amine terminated alkyl disulfide chains are reacted specifically with each maleic anhydride unit present in the copolymer; this results in ring opening and attachment of regularly spaced anchoring chains. Thereafter, hydroxy terminated functional substituents (e.g. CF$_3$(CF$_2$)$_x$OH) are reacted directly and specifically with the isocyanate units in the presence of e.g. triethylamine to produce a carbamate linkage connecting the functional chain to the polymer main chain.

Applications

Application of the polymer of the present invention to an appropriate surface involves simply contacting a solution of the polymer with the desired surface. The solvent for the polymer solution can be any that is liquid at room temperature and atmospheric pressure, in which the polymer is soluble at the concentrations usually employed, and which is inert to the polymer and the surface to which the polymer is applied. Suitable solvents can readily be ascertained; examples generally include chloroform, and methylene chloride.

Alternatively, a solvent can be dispensed with by applying the polymer in the molten state.

The polymer (in solution, or in the molten state) and the surface can be contacted in any conventional matter, such as immersing the surface in the polymer solution or melt or drawing the surface through the solution or polymer. Contact time needed is generally on the order of 8–48 hours. The concentration of the polymer in solution used for this purpose can vary widely, from a few hundredths of a percent by weight to about 10 percent by weight, but in the interest of formation of the desired anisotropic monolayer the polymer concentration in solution is preferably in the range of about 0.1 wt. % to about 5 wt. %.

There is a wide variety of types of surfaces to which the polymers of the present invention may be applied. The resulting novel articles are considered additional aspects of the present invention. Such materials include metals, among which may be included magnesium, aluminum, calcium, scandium, titanium, vanadium, chromium, manganese, iron, cobalt, nickel, copper, zinc, gallium, germanium, arsenic, selenium, rubidium, potassium, strontium, yttrium, zirconium, niobium, molybdenum, ruthenium, rhodium, palladium, silver, cadmium, indium, tin, antimony, tellurium, cesium, lanthanium, lanthanum series metals, hafnium, tantalum, tungsten, rhenium, osmium, iridium, platinum, gold, thallium, lead, and bismuth, as well as combinations of two or more of any of the foregoing, such as gallium arsenide. To form ultrathin films of the polymers of the present invention on metallic surfaces, it is preferred to employ polymers in which the anchoring group contains a sulfide (thiol) or thioether, or a disulfide.

Other materials to which the polymers of the present invention can advantageously be applied include materials having oxidic surfaces, by which is meant materials embodying oxygen or hydroxyl groups at the surface. Examples include oxides and mixed oxides of any of the metals listed above; silicates, aluminosilicates, phosphates, silicophosphates, and the like; silica, including silica gel; organic polymers containing pendant hydroxyl groups, such as homopolymers and copolymers of polyvinyl alcohol or of hydroxy (C$_{1-4}$ alkyl) acrylate; polymeric materials such as cellulose and chemically modified cellulose such as methyl cellulose or hydroxyethyl cellulose, or cellulose acetate, provided that the modified cellulose possesses free hydroxyl groups; starches, dextrans, and other polysaccharides; inorganic and organic materials, including polymers, which possess or have been modified to possess hydroxyl groups on the surfaces thereof, by any suitable modification means including chemical reaction, irradiation, treatment in a gaseous plasma, and the like. To form ultrathin films of the polymers of the present invention bound to any of these oxidic substrates, it is preferred to employ polymers wherein the anchoring groups are silyl substituted with one, two or three halo or alkoxy groups, and otherwise substituted with methyl. Examples of such are dimethylhalosilyl, trihalosilyl or tri(alkoxy)silyl, and preferably trimethoxysilyl.

Upon contact of the polymers with the surface, the polymer undergoes spontaneous self-assembly of the anchoring chains to the surface. There is thus formed a chemically adherent, anisotropic, ultrathin film of the polymer. The film is essentially a monolayer, and will generally be found to be about 25 to about 50 Angstroms in thickness. That the film is essentially an anisotropic monolayer has repeatedly been shown in exacting analysis of products embodying the present invention. The anisotropy provides maximal separation of functional groups by the polymer itself from the anchoring chains and the substrate surface.

With or without functional substituents as described herein, the present invention has many useful applications which include the formation of thin, optically transparent coatings to impart hydrophilicity or hydrophobicity, or protection against corrosion or other chemical attack, as with reaction vessel linings, pipe and conduit linings, and glass and glass-lined equipment as well as window glass. The films can be formed even on substrates having microporous structures such as silica gel and other absorbent materials with high surface area, and on ion-selective membranes, oxygen-permeable coatings, and the like. The polymers are also useful as adhesives, and in the formation of laminates in which a layer formed in accordance with the present invention is sandwiched between two surfaces.

The application of the polymers of the present invention can also be employed in chromatography, for instance, in the modification of a support such as silica gel or a capillary tube or other glass surface to generate a novel chromatographic surface. The functional substituents can be e.g. alkyl chains, or alkyl chains substituted with polar or phenyl groups chosen to afford any desired separation of constituents in the stream being chromatographed. The functional substituent can be a chiral stationary phase permitting resolution of enantiomers from racemic mixtures. Films formed in accordance with the present invention can also be applied to modify the surfaces of glass fibers used in fiber optics, as well as other optical wave guides, and to stabilize colloids and fine dispersions, and to protect the surfaces on light-emitting polymers.

Embodiments wherein the polymers contain functional side chains which are fluorinated, preferably fluorinated alkyl or alkyloxyether chains, are particularly useful to impart a high degree of lubricity or inertness to a surface to which the polymer is applied. Preferably the alkyl group is completely fluorinated, or comprises a highly or completely fluorinated alkyl or alkyloxy group connected to the polymer chain through an unfluorinated alkylene bridge containing 1, 2 or 3 or more carbon atoms. This aspect of the present invention is particularly useful in embodiments wherein the surface being treated cannot be permitted to undergo chemical modification itself, even modification to increase the lubricity, and in embodiments wherein insertion of a distinct lubricant is difficult to effect or when a lubricant would interfere with the other desired uses of the object being lubricated.

A particularly preferred example of such an object is a data storage disk of the type used in computers. This aspect is applicable to hard disks and to soft disks (also referred to as "floppy" disks). Hard disks are often made of a light, strong metal such as aluminum or an aluminum alloy. The disk carries a coating of a magnetic oxide, such as an oxide of iron or chromium. Especially as advances in computer technology lead to denser packing of information on the disk, and to faster disk speeds, the hard disk mechanism can suffer from frictional engagement and sticking of the disk to "slider", the means for reading the disk which rides just above the disk. This problem is especially acute when the disk first begins to rotate from a stationary position. These difficulties are greatly alleviated by bonding to the disk surface, or to the slider means, an ultrathin film having pendant functional chains which are fluorinated, such as the fluorinated alkyl and equivalent chains described hereinabove. Similarly, the polymers of the present invention can be used to provide protective films or low-friction films on floppy disks and magnetic recording tape, for instance by anchoring the polymer to the tape substrate (e.g. Mylar) or to the magnetic media (e.g. iron oxide or chromium oxide). Other applications of the ability to provide a low-friction surface include bearings and other mechanical parts which are subject to surface-to-surface contact.

The present invention is also useful in providing protective coatings exhibiting reduced thrombogenicity and reduced tendency to cause inflammation on implantable prosthetic articles intended to be implanted within the body, such as (without limitation) blood vessel grafts, intraocular lenses, artificial bones, joints, and heart valves, and other implantable articles presenting a risk of thrombogenicity or inflammation. In particular, polymers having fluorinated alkyl side chains are useful in this regard as they reduce protein adsorption and cell growth; and alkyl side chains are useful in this regard as they sequester albumin onto the surface, thereby imparting reduced thrombogenicity.

Other applications of the polymers of the present invention are found in the field of microelectronics. The polymers can be used to form protective films on circuit boards, or selectively on portions of circuit boards, such as the portions comprising exposed conductive metal circuitry or oxide matrix. They also can be used to advantage in the fabrication of microcircuitry on a substrate. For instance, a pattern can be formed on a substrate such as silicon or another dielectric material, by use of photolithography, a focused ion beam, or other means used in this field, in conjunction with suitable masking apparatus, such that a pattern as desired which is composed of oxidic material is formed on the substrate surface. Then, a polymer in accordance with the present invention having an anchoring group suitable to chemisorb to the oxidic portions of the surface is contacted with the thus-treated surface, leaving an ultrathin polymeric film on the surface in the pattern created by the operator. If the polymer is electrically conductive, the resultant article comprising a substrate carrying the electrically conductive pattern can be used as such directly in the fabrication of microelectronic devices. Alternatively, the article thus formed can be subjected to further treatment whereby the surface of the substrate is contacted with e.g. a solution of a conductive metal, under conditions such that the conductive metal is bound only to the thus-deposited polymer, or alternatively only to those regions of the substrate to which the polymer is not bound. In either embodiment, the article comprising the substrate to which is adhered metal in the predetermined pattern is useful for subsequent fabrication of microelectronic devices. Alternatively, the polymers of the present invention can be used to provide thin protective coatings, particularly useful in resisting oxidation, when applied to metal that has already been applied to a circuit board or other microelectronic surface.

The polymers of the present invention also find application in the field of biochemistry. An article useful in, for instance, immunoassay can be formed by providing a polymer in accordance with the present invention with functional side chains carrying a terminal group which can be chemically attached to e.g. an antibody. Such a polymer is then applied as an ultrathin film to the surface of a polymeric or metal article (which has, if necessary, previously been suitably conditioned to generate hydroxyl groups on its surface). Such a polymeric article can then be used to immobilize antibodies and used in analytical techniques; the article can be formed into wells of the type conventionally used in immunoassays.

Additional functionalization includes immobilizing enzymes, or cell growth and adhesion factors, such as the tripeptide RGD (arginine-glycine-aspartic acid) known to be a useful point of attachment for cell growth. The polymer according to the present invention is bound to a substrate, across the surface thereof or in a predetermined pattern established by conditioning the surface so that the anchoring groups can bind only within regions forming the pattern. The polymer has functional chains to which are attached RGD residues. Contacting the polymer with a suspension of cells can thereby lead to attachment of the cells to the RGD sites.

It will be recognized that nucleotides can also be functional groups attached to the functional chains of the polymers of the present invention. This embodiment is useful in assays and analyses of nucleotide sequences and in synthesis of therapeutic products.

Polymers in accordance with the present invention can also be used to provide functional coatings to surfaces. One example is providing hydrophobic coatings to any of a wide variety of materials. Examples include coatings to passivate corrosion on aerospace, nautical, and electrical components. Other examples include providing bioresistant coatings and antifoulant coatings to marine vessels, pipes, pilings, screens, and any other objects conventionally immersed in water and customarily prone to attack by water-borne organisms. Yet another example is the formation of a film on a contact lens, including hard lenses (e.g. polymethyl methacrylate), soft lenses (made of hydrophilic materials such as copolymers of 2-hydroxyethyl methacrylate), and silicone-based lenses. The film protects against abrasion and provides the lens with a reduced tendency to accrete deposits of mucins, lipids and other materials in the eye.

Surfaces can be rendered resistant to biofouling, i.e. to accretion of proteins by attaching polymers as taught herein wherein the polymers have functional poly(ethyleneoxy) side chains.

Another advantageous feature of the present invention is that successive ultrathin layers can be formed on the surface of a substrate. Thus, following the application of a film as described herein, with a polymer having nonanchoring side chains extending anisotropically away from the main chains and from the anchoring chains, a second polymer is applied to the resulting coating. The nonanchoring side chains of the first polymer should be substituted with functional groups to which the anchoring side chains of the second polymer chemisorb, such as hydroxyl groups which bind with silanyl anchoring groups on the second polymer. Building a plurality of layers in this way enhances the ability to provide protective films to a substrate.

Useful products can be prepared from polymers within the scope of the invention wherein the polymers main claim and anchoring chains are electrically conductive, and the functional chains contain receptors for ligands or antigens. If a ligand and a receptor therefor interact with the generation of an electric signal, such can be detected if the anchoring chains have been bound to e.g. a metal surface which is also connected via a wire to a sensor or detector for sensing the generation of the signal.

Alternatively, the main chain of the polymer can be a light-emitting polymer such as polyquinoline or polyanthrazoline, and the functional substituent is an electrically conductive polymer such as polypyrrole, polythiophene or polyaniline. In another embodiment, the main chain can be an electrically conductive polymer, and the functional substituent a light-emitting polymer.

The functional groups can also impart adhesive properties to the surface, by attaching chains determined from experience to provide tack or adhesiveness. Examples include polar species such as acetates, acrylates, cationic or anionic species and polymerizable groups such as vinyl groups.

What is claimed is:

1. A process for forming an adherent, ultrathin, anisotropic film on an oxidic, graphitic or metallic surface, comprising providing a polymer comprising siloxanyl main chains from which are pendant alkylene anchoring chains to each of which is bound an anchoring group selected from the group consisting of —SH, alkylsulfides, —CHCH$_2$CH$_2$SS, thioethers, alkyldisulfides, —Si(CH$_3$)$_p$(A)$_{3-p}$, wherein p is 1, 2 or 3 and A is halogen or alkoxy containing 1 to 4 carbon atoms, pyridine, isonitrile, and —COOH, for binding through chemisorption to a solid surface, wherein said polymer further comprises a plurality of fluorinated alkyl-capped, fluorinated polyalkoxy side chains, wherein the polymer is capable upon said binding of forming from solution a self-assembled ultrathin anisotropic film on said surface, and contacting said polymer with said surface under conditions effective to cause said anchoring groups to chemisorb to said surface.

2. A process according to claim 1 wherein said side chains are further substituted with a functional group and separated from said surface by said film, the process further comprising contacting said film with a second polymer comprising a main chain from which are pendant a plurality of anchoring chains to each of which is bound an anchoring group for binding through chemisorption to said functional groups under conditions effective to cause said anchoring chains of said second polymer to chemisorb to said functional groups.

3. A process for forming an ultrathin low-friction film on an oxidic, graphitic or metallic surface, comprising contacting said surface with a solution of a polymer comprising siloxanyl main chains having a plurality of pendant alkylene anchoring chains to each of which is bound an anchoring group selected from the group consisting of —SH, alkylsulfides, —CHCH$_2$CH$_2$SS, thioethers, alkyldisulfides, —Si(CH$_3$)$_p$(A)$_{3-p}$, wherein p is 1, 2 or 3 and A is halogen or alkoxy containing 1 to 4 carbon atoms, pyridine, isonitrile, and —COOH, for binding through chemisorption to said surface, wherein said polymer further comprises a plurality of fluorinated alkyl-capped, fluorinated polyalkoxy side chains, wherein upon said binding said polymer forms from solution a self-assembled monolayer on said surface, under conditions effective to cause binding to occur, said polymer also having a plurality of nonanchoring side chains effective to reduce the coefficient of friction of said surface.

4. The process of claim 3 wherein said nonanchoring side chains effective to reduce the coefficient of friction are selected from the group consisting of fluorinated alkyl and alkoxyalkyl groups.

5. The process of claim 4 wherein said fluorinated alkyl and alkoxy groups are selected from the group consisting of perfluoroalkyl, perfluoralkylalkyl, perfluoroalkyl-alkoxyalkyl, and perfluoroalkoxyalkyl.

6. A process for imparting a selected property to a solid surface, comprising applying to said surface an ultrathin, anisotropic, chemically adherent film of a polymer comprising siloxanyl main chains from which are pendant alkylene anchoring chains to each of which is bound an anchoring group selected from the group consisting of —SH, alkylsulfides, —CHCH$_2$CH$_2$SS, thioethers, alkyldisulfides, —Si(CH$_3$)$_p$(A)$_{3-p}$, wherein p is 1, 2 or 3 and A is halogen or alkoxy containing 1 to 4 carbon atoms, pyridine, isonitrile, and —COOH, from which extend a plurality of fluorinated alkyl-capped, fluorinated polyalkoxy side chains effective to impart the selected property to said surface.

7. A process according to claim 1, 3 or 6 wherein the siloxanyl main chains are further substituted with at least one substituent, wherein the substituents are the same or different and are selected from the group consisting of hydrogen and methyl.

8. A process according to claim 1, 3 or 6 wherein the side chains are perfluoro-alkyl capped, perfluorinated polyalkoxy.

9. A process according to claim 1, 3 or 6 wherein the side chains are perfluoromethyl capped, perfluorinated polyalkoxy.

10. A process according to claim 1, 3 and 6 wherein said side chains are substituted with one or more functional group selected from the group consisting of —NH$_2$, CH$_2$=CHC(O)O—, CH=C(CH$_3$)C(O)O—, SF$_5$, SO$_2$F, —OH, —C(O)OH, —C(O)Cl, —CH=CH$_2$, —OC(O)CH$_3$, cationic species, anionic species, zwitterionic species, proteins, amino acids, polypeptides, pharmacologically active agents, catalysts, dyes, liquid crystals, antibodies, and antigens.

11. A process according to claim 2 wherein the functional group is selected from the group consisting of —NH$_2$, CH$_2$=CHC(O)O—, CH=C(CH$_3$)C(O)O—, SF$_5$, SO$_2$F, —OH, —C(O)OH, —C(O)Cl, —CH=CH$_2$, —OC(O)CH$_3$, cationic species, anionic species, zwitterionic species, proteins, amino acids, polypeptides, pharmacologically active agents, catalysts, dyes, liquid crystals, antibodies, and antigens.

12. A process according to claim 1 further comprising contacting said film with a second polymer comprising a main chain from which are pendant a plurality of anchoring chains to each of which is bound an anchoring group for binding through chemisorption to said side chains on the first polymer under conditions effective to cause said anchoring chains of said second polymer to chemisorb to said side chains on the first polymer.

* * * * *

UNITED STATES PATENT AND TRADEMARK OFFICE
CERTIFICATE OF CORRECTION

PATENT NO. : 5,686,549
DATED : November 11, 1998
INVENTOR(S) : David W. Grainger, et al.

It is certified that error appears in the above-identified patent and that said Letters Patent is hereby corrected as shown below:

Column 5, line 27: "zwitterfonic" should read --zwitterionic--

Column 6, line 43: "$HSiC_{13}$" should read --$HSiCl_3$--

Column 8, line 18: "37/64" should read --36/64--

Signed and Sealed this

Twelfth Day of January, 1999

Attest:

Attesting Officer     *Acting Commissioner of Patents and Trademarks*